June 12, 1962 M. F. PETERS 3,038,336
SYSTEM FOR MEASURING HEIGHT AND DENSITY OF LIQUIDS
Filed April 28, 1958 3 Sheets-Sheet 1
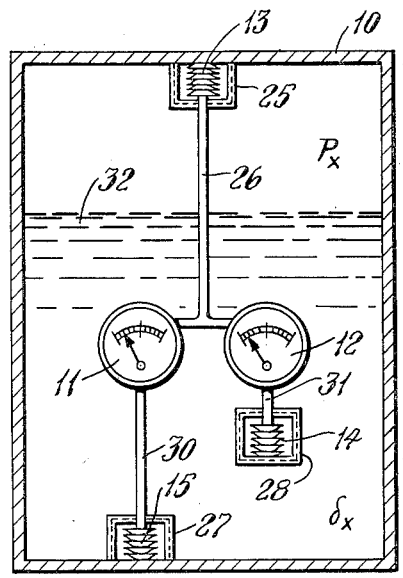
Fig. 1
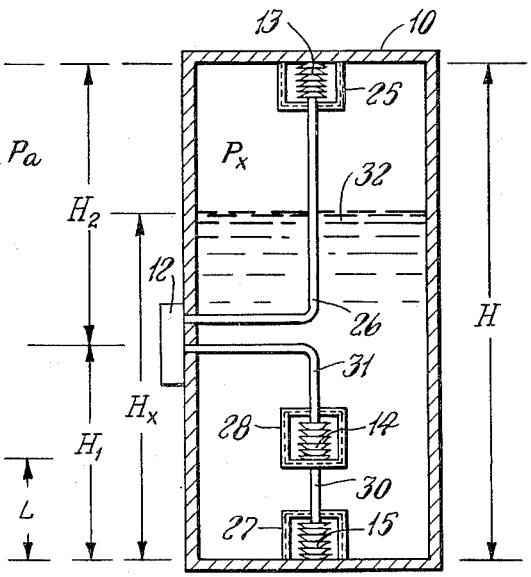
Fig. 2
Fig. 3
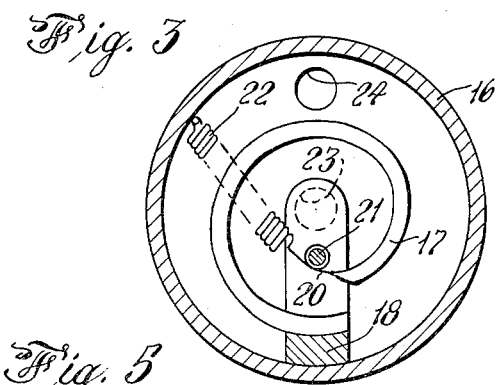
Fig. 5
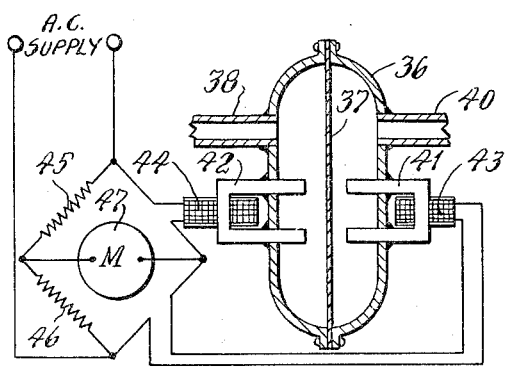
Fig. 4
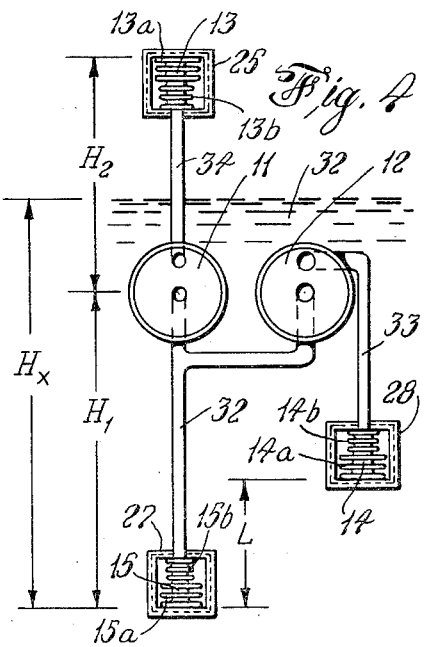
INVENTOR.
MELVILLE F. PETERS
BY *Albert F. Kronman*
ATTORNEY

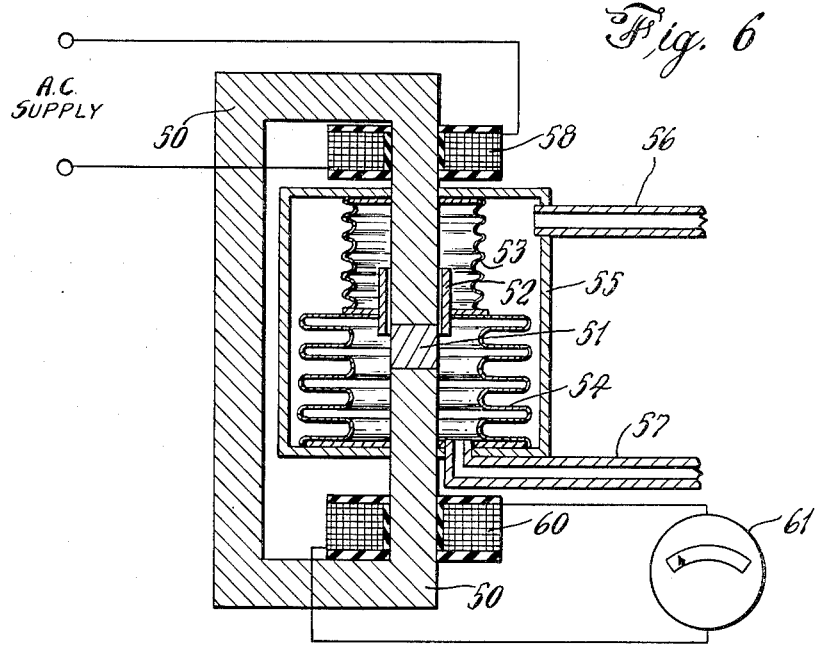
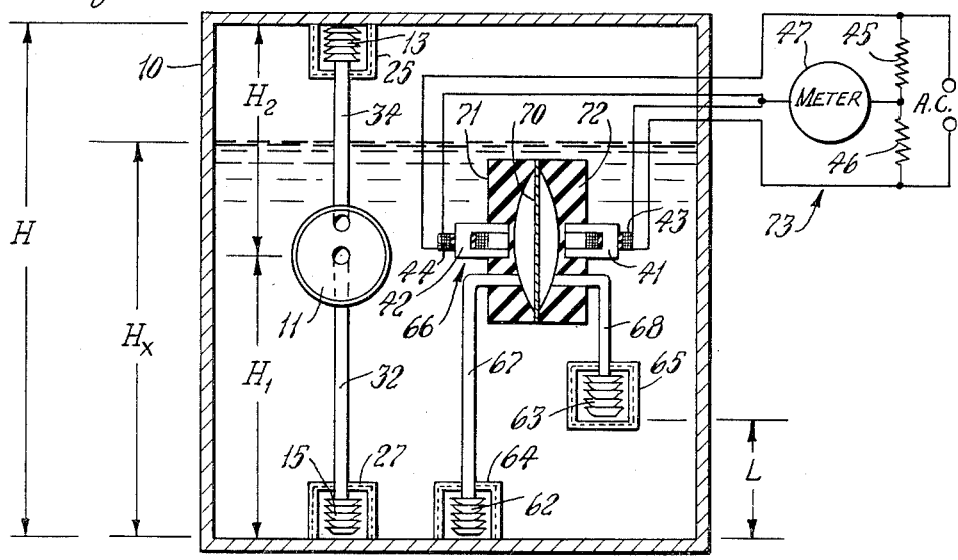

June 12, 1962   M. F. PETERS   3,038,336
SYSTEM FOR MEASURING HEIGHT AND DENSITY OF LIQUIDS
Filed April 28, 1958   3 Sheets-Sheet 3

INVENTOR.
MELVILLE F. PETERS
BY
ATTORNEY

United States Patent Office 3,038,336
Patented June 12, 1962

3,038,336
SYSTEM FOR MEASURING HEIGHT AND DENSITY OF LIQUIDS
Melville F. Peters, 29 N. Ridge Road, Livingston, N.J., assignor of fifty percent to Joseph J. Mascuch, Millburn, N.J.
Filed Apr. 28, 1958, Ser. No. 731,445
10 Claims. (Cl. 73—299)

This invention relates to a system of pressure gauges for determining both the height and the density of a liquid within a closed container. The invention has particular reference to the determination of these quantities when the pressure within the container acting on the surface of the liquid may have any value between zero and one thousand or more pounds per square inch.

The use of pressure gauges for determining the height of liquids within a container when the density is known is old in the art and has been used for many years. There are many well-known methods for determining the density of a liquid when the liquid is accessible such as a hydrometer floating in the liquid. The present invention determines both the height of the liquid in a closed container and also its density even though the pressure within the container may vary over a wide range of values.

Since the solution of this problem involves the determination of two unknowns, the height and density of the liquid, the solution will require two independent readings to be made upon a single confined liquid by suitable sensing pressure sensitive devices. While there are many ways in which these two unknown quantities can be determined, the hydraulic sensing system shown in the drawings has been selected because it has no moving parts, and in addition to this advantage it is simple, dependable, and can be constructed from inexpensive components.

One of the objects of this invention is to provide an improved system for measuring height and density of liquids which avoids one or more of the disadvantages and limitations of prior art arrangements.

Another object of the invention is to measure the height and density of liquids within a closed container which may be under changing pressure.

Another object of the invention is to reduce the cost of pressure and density measuring systems by employing standard elements.

Another object is to eliminate moving parts by having the information from the sensing element transmitted to the indicating unit by the pressure set up in a liquid.

Still another object of the invention is to have the information transmitted from the sensing element to the indicating element with the speed of sound.

The invention includes a system for measuring the height and density of a liquid in a closed container and includes two differential pressure gauges, one of which measures the difference in pressure between a liquid at the bottom of the container and the pressure of the gas at the top of the container. A second differential pressure gauge measures the difference in pressure existing between two positions within the liquid, one of which is generally placed at the bottom of the container and the other of which is a known distance above the first position, although it is within the scope of the invention to make these differential pressure measurements at several elevations in the liquid. Each pressure gauge is connected to pressure sensitive devices which transmit the pressure of the liquid to the measuring instrument. A simple computation is used to determine both the height and the pressure of the liquid within the container.

For a better understanding of the present invention, together with other and further objects thereof, reference is made to the following description taken in connection with the accompanying drawings.

FIGURE 1 is a diagrammatic side view of the measuring system, showing the positions of the two measuring instruments and three pressure sensitive devices.

FIGURE 2 is an end view of the container shown in FIGURE 1.

FIGURE 3 is a detailed view of one form of a Bourdon gauge for measuring pressure.

FIGURE 4 is a somewhat diagrammatic view similar to FIGURE 1 but having an alternate system of connections between the gauges and showing the use of two diameter bellows members.

FIGURE 5 is a cros sectional view of an alternate form of a differential device for obtaining the pressure difference existing in two conduits.

FIGURE 6 is a cross sectional view of a second alternate form of differential device.

FIGURE 7 is a cross sectional view of a measuring system using the form of differential device, shown in FIGURE 5.

Figure 8:
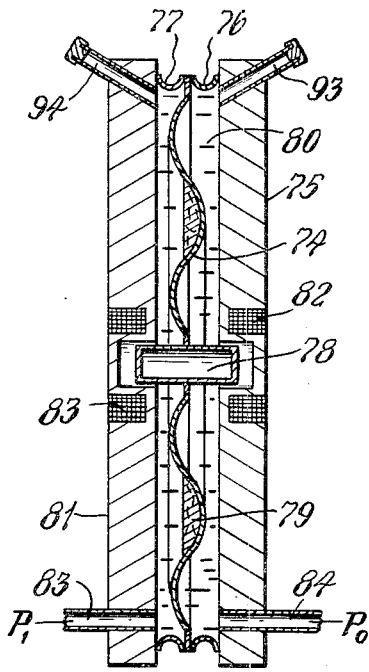
FIGURE 8 is a cross sectional view of a third alternate form of differential device.

The devices shown in FIGURES 5, 6 and 7 are electromechanical and the results are indicated on the dials of electrical meters.

Referring now to FIGURES 1 and 2, the invention comprises a closed container 10, two pressure gauges 11 and 12, and three pressure sensitive devices 13, 14 and 15, which in this case are shown as collapsible bellows. Each pressure gauge is a differential gauge and may be of the Bourdon type, shown in FIGURE 3 and consists of an outer casing 16, an oval tube 17 disposed in the shape of a spiral, mounted at one end on a block 18 and connected at its other end by a flexible string 20 to a pivoted shaft 21 which turns the indicating needle. A return force spring 22 may be employed but this is not always necessary. The Bourdon tube 17 is hollow and its cavity is connected to a pipe coupling 23 at the rear of the gauge. Another pipe coupling 24 is connected to the inside volume of the gauge chamber which is made fluid-tight. This gauge (see FIGURE 3) will indicate the difference in pressure between the fluid in pipe 23 and the fluid in pipe 24.

As indicated in FIGURE 1, bellows 13 is enclosed in a porous or screening receptacle 25 to control the quantity of solid material which can come in contact with bellows 13. Bellows 13 is connected by a conduit 26 to the outer chamber of gauges 11 and 12. In a similar manner bellows 15 is surrounded by a porous or screening container 27 and bellows 14 is surrounded by porous or screening container 28, the bellows 14 and 15 within these containers being connected by conduits 30 and 31 to the flat spiral 17 in gauges 11 and 12.

Since bellows 13 is at the top of the container and bellows 15 is at the bottom, the differential reading on gauge 11 will record or indicate the difference in pressure between the two bellows. This reading can be used to determine the pressure exerted by liquid 32 of height $H_x$ on the bottom of the container.

Before this pressure reading can be converted into height, it is necessary to know the density of the liquid 32. This density can be obtained by measuring with gauge 12 the difference in pressure between bellows 15 and bellows 14 which is placed a known vertical distance above bellows 15.

It should be pointed out that by making the effective volume of bellows 13, 14 and 15 large compared to the infinitesimal change in volume which takes place when the Bourdon gauge indicates a change in pressure, that the assembly can be said, from a practical standpoint, to indicate a change in pressure without moving parts, and that the stress imparted to the liquid in the assembly is transmitted from bellows to gauge with the velocity of sound.

To give a specific example of how the unit can be operated, assume the distance between bellows 14 and 15 is L, the height of the gauges 11 and 12 above the bottom of the container is $H_1$, the distance from the gauges to the top of the container is $H_2$, and the unknown height of the liquid 32 is $H_x$. It will also be assumed that the density of the liquid is $\delta_x$, the pressure of the gas within the container is $P_x$, and that the entire conduit system, bellows and gauges are filled with liquid of density $\delta_1$. While the outer casings of gauges 11 and 12 must be strong enough to withstand the pressure differential $P_x$ minus the pressure outside the container which is $P_a$, and which may be a thousand pounds or more, the pressure differential across the Bourdon indicator 17 or diaphragm 37 (FIGURE 5) will never be greater than the weight of a column of liquid L units high across gauge 12, or greater than the weight of a column of liquid H units high across gauge 11. For these reasons both gauges 11 and 12 have sensitive sensing elements and strong cases.

It will be obvious from FIGURES 1 and 2 that the pressure exerted on gauge 11 on the inside chamber through pipe 26 and opening 24 is:

$$H_2\delta_1 + P_x \quad (1)$$

The internal pressure applied to the inside of spiral 17 through pipe 30 and opening 23 is:

$$H_x\delta_x + P_x - H_1\delta_1 \quad (2)$$

The pressure reading $R_1$ on gauge 11 will equal the difference between Equations 1 and 2:

$$R_1 = H_2\delta_1 + P_x - H_x\delta_x - P_x + H_1\delta_1 \quad (3)$$

or $$R_1 = H\delta_1 - H_x\delta_x \quad (4)$$

where $$H = H_1 + H_2$$

Equation 4 shows that reading $R_1$ is independent of the pressure $P_x$.

The pressure exerted on the outside of the Bourdon spiral of gauge 12 through conduit 26 is:

$$H_2\delta_1 + P_x \quad (5)$$

The pressure exerted on the inside of the Bourdon spiral in gauge 12 is:

$$(H_x - L)\delta_x + P_x - (H_1 - L)\delta_1 \quad (6)$$

The pressure reading $R_2$ on gauge 12 will equal the difference between Equations 5 and 6:

$$R_2 = H_2\delta_1 + P_x - (H_x - L)\delta_x - P_x + (H_1 - L)\delta_1 \quad (7)$$

or $$R_2 = H\delta_1 - H_x\delta_x + L(\delta_x - \delta_1) \quad (8)$$

Subtracting $R_1$ from $R_2$:

$$R_2 - R_1 = L(\delta_x - \delta_1) \quad (9)$$

or $$\delta_x = \delta_1 + \frac{R_2 - R_1}{L} \quad (10)$$

The quantities $\delta_1$ and L are respectively, the density of the liquid in the conduits, and the difference in height of bellows 15 and 14. These quantities are known because they are part of the structure and their values are predetermined. Quantities $R_1$ and $R_2$ are read from the gauge dials, and therefore, the density of the liquid 32 is easily determined.

From Equation 4

$$H_x = \frac{H\delta_1 - R_1}{\delta_x} \quad (11)$$

The quantities H, $\delta_1$, and $\delta_x$ have predetermined values and $R_1$ is read from gauge 11, therefore the height of the liquid 32 can be calculated by using this equation.

In actual practice the two gauges 11 and 12 may be combined into a single unit and the information put into a computing machine which will give the height $H_x$ as a single reading. However a cheaper method of determining $H_x$ from the pair of readings can be made by the use of a family of curves or the use of two tables similar to Tables I and II.

$$\delta_x = 1 \text{ and } L = 30$$

*Table I*

| $R_2-R_1$, grams/sq.cm. | $\delta_x$, grams/cc. | $R_2-R_1$, grams/sq.cm. | $\delta_x$ grams, cc. |
|---|---|---|---|
| 0 | 1.00 | 8 | 1.267 |
| 1 | 1.033 | 9 | 1.300 |
| 2 | 1.067 | 10 | 1.333 |
| 3 | 1.100 | 11 | 1.367 |
| 4 | 1.133 | 12 | 1.400 |
| 5 | 1.167 | 13 | 1.433 |
| 6 | 1.200 | 14 | 1.467 |
| 7 | 1.233 | 15 | 1.500 |

As soon as the density is established, the height of the liquid can be computed from Equation 11 for any pressure readings $R_1$ and $R_2$ after the height H of the container is measured. For example, assuming that $H=20$ feet or 610 centimeters, $\delta_1=1$, and $R_1$ and $R_2$ both read 180 grams per sq. cm., then the height of the liquid is $$H_x = \frac{610 - 180}{1} = 430 \text{ cm. or } 14.11 \text{ feet}$$

If $R_1=180$, $R_2=186$, then $R_2-R_1=6$ and the density, taken from Table I is 1.2. The height of the liquid is:

$$H_x = \frac{610 - 180}{1.2} = 360 \text{ cm. or } 11.76 \text{ feet}$$

A table may be made to facilitate the determination of liquid height after the density is determined.

$$H = 610 \text{ and } \delta_1 = 1$$

*Table II*

| $R_1$, grams/sq.cm. | $\delta_x=1$ | $\delta_x=1.1$ | $\delta_x=1.2$ |
|---|---|---|---|
| | Feet | Feet | Feet |
| 610 | 0.0 | 0.0 | 0.0 |
| 570 | 1.31 | 1.19 | 1.09 |
| 470 | 4.59 | 4.18 | 3.83 |
| 370 | 7.87 | 7.16 | 6.56 |
| 270 | 11.15 | 10.14 | 9.30 |
| 180 | 14.11 | 12.83 | 11.76 |
| 90 | 17.06 | 15.51 | 14.22 |
| 45 | 18.54 | 16.85 | 15.45 |

It is obvious that the density $\delta_x$ cannot be determined until the level of liquid 32 reaches bellows 14. This disadvantage may be corrected by positioning bellows 15 in a sump and bellows 14 on a level with the bottom of container 10.

The structure shown in FIGURE 4 is an alternate arrangement of conduit connections, bellows 15 being connected by conduit 32 to both gauges 11 and 12. Bellows 14 is connected to the casing of gauge 12 by conduit 33 and bellows 13 is connected to the casing of gauge 11 by conduit 34.

It will be obvious that the pressures on gauge 11 inside the casing and inside the Bourdon spiral are the same as in FIGURE 1 because the connections are the same. The Equations 1 to 11 inclusive apply equally well to this arrangement and their derivation need not be repeated, since Equation 10 which is $$\delta_x = \delta_1 + \frac{R_2 - R_1}{L}$$

and Equation 11 which is $$H_x = (H\delta_1 - R_1)\delta_x$$

can be used with the two readings $R_1$ and $R_2$.

As before, $\delta_1$ and L are known and $R_2$ is read from dial 12 so the density can easily be calculated. The height $H_x$ is obtained from Equation 11 as before.

The Bourdon gauges 11 and 12 may not be well suited to the determination of the differential pressures to be measured and other gauges may be used. FIGURE 5 shows one form of electromagnetic device which is sturdy, uses a small amount of liquid, and can be read at a distance because the indicating meter is connected by wires to the differential chamber. The device comprises a double non-magnetic container 36 supporting a flexible paramagnetic diaphragm 37 which divides the chamber into two parts. Conduits 38 and 40 connect to the two pressure sensing elements which are used to indicate the pressure differential, to be measured.

On each side of the diaphragm 37, paramagnetic cores 41 and 42 are mounted with the core ends adjacent to the diaphragm surface. The cores are welded to the sides of the container and windings 43 and 44 are placed on the cores to induce alternating magnetic flux in the core material and the diaphragm.

The change in impedance of the two coils 43, 44 which is caused by the change in reluctance of the magnetic paths of 41 and 42 respectively with a change in the position of the diaphragm 37 can be determined by the bridge circuit shown in FIGURE 5. The circuit uses the two coils 43 and 44 as two of the arms, with equal resistors 45 and 46 as the other two arms. An alternating current supply is connected to two opposite junction points of the bridge and an indicating meter 47 is connected to the other two junction points.

When this device is in operation and the pressures of the liquids in conduits 38 and 40 are equal, the diaphragm remains in its central position and the reluctance of the magnetic paths are equal. If the windings 43 and 44 are identical, their impedances are equal with diaphragm 37 centrally located and the bridge is balanced. If the pressures are not equal, the diaphragm 37 is moved toward one core and away from the other, increasing the reluctance and lowering the impedance of one winding and decreasing the reluctance and raising the impedance of the other winding. This unbalances the bridge and the meter indicates a value of current which can be calibrated to read directly in pressure difference.

The device shown in FIGURE 6 illustrates another structure which produces an electrical voltage proportional to the difference between two pressures. It comprises a paramagnetic core 50 which may be made of laminated iron. The core is continuous except for a short length 51 of non-magnetic material which may be brass or Bakelite. Surrounding the core, adjacent to length 51 is an iron sleeve 52, supported by two bellows 53 and 54. Bellows 53 has a small diameter, not much larger than the core, and it is designed to help support the sleeve 52. Bellows 54 is much larger and is designed to operate between two fluids and determine their pressure difference.

The ends of bellows 53 and 54 are secured to a container 55 which is welded to the core 50. One portion of the container is connected to an exterior pressure system by conduit 56. It is apparent from the figure that the fluid in conduit 56 exerts pressure on the outside of bellows 54 tending to lower sleeve 52. The lower portion of container 55 is connected to a second exterior pressure system by conduit 57. Fluid in this conduit exerts pressure on the inside of bellows 54 tending to raise sleeve 52. The position of sleeve 52 is thus responsive to the difference between the pressures communicated by the two conduits 56 and 57.

In order to determine the sleeve's position, a winding 58 is mounted on the core and supplied with alternating current power, thereby inducing an alternating magnetic flux in the core, the intensity of which depends upon the position of sleeve 52. If sleeve 52 is moved up by an excess of pressure from conduit 57, the reluctance of the magnetic path is increased and a reduced flux will be induced in the core material. If the sleeve is moved down by an increase in pressure from conduit 56, the reluctance of the magnetic path is reduced and a higher flux results. The magnitude of the flux is detemined by a second winding 60 surrounding core 50 which is connected to an indicating instrument 61. This instrument may be a galvanometer, a voltmeter, or an electronic amplifier connected to some similar indicating means. The indicating scale on meter 61 may be calibrated to read in pressure values to indicate the difference in pressure between conduits 57 and 56.

When the fluid operating the bellows assembly is a liquid, a float or additional mass similar to the ones shown in FIGURE 8 can be added to the bellows assembly so that the effective mass of 52, 53, 54 is equal to the mass of the liquid it displaces. These additions to the assembly are necessary if the pressure differential readings are to be independent of the weight and position of the bellows assembly.

The device shown in FIGURE 7 contains a differential arrangement similar in operation to the unit shown in FIGURE 5 but with a different arrangement of bellows and conduits.

The container 10 of FIGURE 7 houses two separate elements of the system. One is a Bourdon gauge 11 connected by one conduit 32 to a bellows 15 inside a porous or screening receptacle 27 at the bottom of the container. Gauge 11 is also connected to a second conduit 34 connected to a second bellows 13 inside a second receptacle 25 at the top of the container. The reading $R_1$ on this gauge gives the difference in pressures between the top and bottom of the container and is therefore directly proportional to the height of the liquid $H_x$. If the density of the liquid is known, the height can be calculated at once using only this reading.

The second system includes two bellows 62 and 63, each enclosed in a porous shell 64 and 65. The bellows are separated by a vertical distance L and each is connected to a differential gauge 66 by conduits 67 and 68. The differential gauge 66 comprises a flexible diaphragm 70 held between two blocks 71, 72, of any non-paramagnetic material such as one of the metals or one of the plastics as Bakelite. Each block is formed with a concave portion adjacent to the diaphragm 70 so that the diaphragm is free to move for a short distance but is protected from fracture in case abnormal pressure differentials are applied.

Each block 71 and 72 contains a U-shaped paramagnetic core 41 and 42 which may be supported by a cavity in each block. Each core has a winding 43 and 44 each of which is connected to an external bridge 73 which includes two resistors 45 and 46 and an indicating meter 47. The difference in pressure caused by the difference in height L (and the density of the liquid) causes the diaphragm to move to one side, toward core 41 in FIGURE 7, thereby increasing the reluctance of this magnetic path and decreasing the reluctance of the path associated with core 42. This change in magnetic values causes a change in impedance in windings 43 and 44, causing the bridge 73 to be unbalanced and producing an indication on meter 47. The meter can be calibrated to read in pressure units.

When the height L is known, the density of the liquid can be determined by noting the pressure on meter 47 and dividing by the distance L.

In FIGURE 8 there is shown a gauge which can be used to advantage in liquids and is particularly adapted to be used as a sensitive pressure gauge with the liquid level meter, where the diaphragm assembly must have an effective density equal to the density of the fluids 80 in the gauge. The unit consists of a diaphragm 74 which is pressed into the corrugated shape after it is welded to rings 76 and 77. The cylindrical element 78 is made of material having paramagnetic properties and is welded to the diaphragm 74. While the element 78 may be a solid cylinder, it will in most installations be hollowed as shown in the figure so that its weight will be equal to the weight of the liquid 80 it displaces, or will be equal to the weight of the liquid, it and the diaphragm together displaces. This means that 78 alone or together with diaphragm 74 is supported by the liquid and consequently the force exerted by the diaphragm assembly due to the mass of the assembly on the supporting rings will be independent of the position of the gauge. In some installations it may be advantegous to form cylinder 78 so its mass is equal to the mass of water displaced and make the effective mass of the diaphragm equal to the mass of water displaced by adding floats 79.

When the liquid 80 contacting the diaphragm is heavier than the paramagnetic material 78, sufficient lead, bismuth, or other heavy material can be put into the cavity of 78 so that its effective mass will be equal to the mass of the heavier displaced liquid.

The two conduits 93 and 94 which are attached to the uppermost parts of the casing elements 75 and 81, are for allowing trapped air to escape when the conduits, bellows and gauge are filled with fluid of density $\delta_1$. After the system is filled, the ends of the conduits can be sealed off as shown.

As the unit is used in the liquid level meter, the pressure $P_0$ which is transmitted to the gauge through conduit 84 can become very much greater than $P_1$ which is transmitted to the gauge through conduit 85, and may become great enough to damage diaphragm 74. Since these pressure readings are not used in determining the height of the liquid in the container it is possible to protect 74 against these high pressure differentials $P_0-P_1$, without decreasing the sensitivity of the gauge. This is done by positioning the casing element 81 so that it forms a support for 74 when $P_0-P_1$ exceeds a predetermined value.

The other half of the casing 75 is positioned so that the diaphragm 74 can move through a sufficient distance to indicate the predetermined pressure differential and can be adjusted so that before the pressure differential $P_1-P_0$ exceeds the safe operating value, 75 will support 74. The positioning of these two casing elements 75 and 81 which are made of material which is not paramagnetic, is controlled by the width of the two rings 76 and 77 respectively. The displacement of 74 from left to right will increase with an increase in $(P_1-P_0)$. This movement of 74 to the right will increase the impedance of coil 82 and decrease the impedance of coil 83, and these changes in impedance of the two coils which depend upon the change in pressure can be measured by one of the electrical measuring circuits shown in FIGURES 5, 6 and 7, after which the pressure differential $(P_1-P_0)$ can be determined from a calibration curve.

Figure 9:
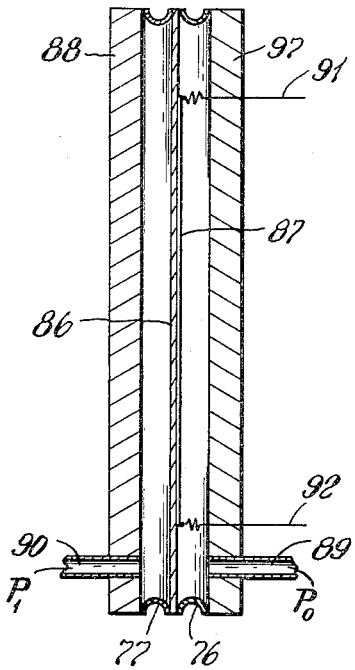
FIGURE 9 is a cross sectional view of a fourth alternate form of differential device.

The pressure measuring element in FIGURE 9 consists of the diaphragm 86, the strain sensing element 87 which is a length of wire cemented to 86, the casing 97, 88 which supports diaphragm 86, the two conduits 89 and 90 for admitting fluid pressure to the two sides of the gauge and the two lead wires 91 and 92 which connects the two terminals of 87 to a Wheatstone bridge. Since the sensing element 87 responds to strains set up in diaphragm 86, the sensing of a change in the pressure differential $(P_1-P_0)$ takes place with no appreciable displacement of the diaphragm, so that for all practical purposes pressure measurements are obtained without moving parts and these pressure changes are transmitted from sensing element to gauge with the velocity of sound.

Figure 10:
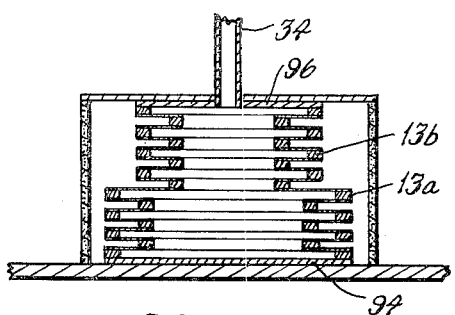
FIGURE 10 is a sectional view somewhat enlarged of the two diameter bellows shown in FIGURE 4.

In many installations it is necessary to secure both ends of the bellows to the supporting structure. Shipboard conditions for example, which involve a rolling action which would disturb the assembly make it important to anchor both ends of the bellows. Bellows members such as are shown in FIGURES 4 and 10, are particularly suited for this purpose. These bellows hereinafter referred to as two piston area bellows indicated at 13, 14 and 15, consist of enlarged bellows 13a, 14a, 15a, having a greater piston area than that of a smaller bellows 13b, 14b, 15b, to which they are secured. The two bellows are joined together at their common junction. The free ends of each bellows may be capped by end plates 94, 96 (FIGURE 10) which are fastened to a portion of the container structure in which they are carried. The end plates 94, and 96, are secured to the rigid containers in which the bellows are housed. The conduit 34 is used to make a fluid connection between the bellows assembly 13 and the gauge 11.

When the outside pressure $P_0$ is increased, the pressure differential $P_0=P_1$ is increased and the large bellows 13a is compressed. The compression of the large bellows decreases the internal volume of the bellows assembly and increases the internal pressure $P_1$. This increase in pressure is then transmitted to the gauge 11. It will be noticed that there is no change in the overall length of the bellows when the volume of the bellows changes in this type of structure.

When the pressure $P_0$ is decreased, the pressure differential $P_0=P_1$ is decreased, bellows 13a expands and compresses bellows 13b. This action decreases the internal volume of the bellows assembly and decreased the internal pressure $P_1$, which in turn is transmitted to the gauge 11.

Having thus fully described the invention, what is claimed as new and desired to be secured by Letters Patent of the United States is:

1. A system for measuring the height and density of a liquid in a container comprising a first fluid filled pressure sensitive device within the container at the top thereof, a second fluid filled pressure sensitive device within the container at the bottom thereof, a first differential gage connected to the fluid in the said first and second pressure sensitive devices to indicate the difference in pressure between a position at the top of the container and a position at the bottom of the container, a third fluid filled pressure sensitive device within the container intermediate the first and second pressure sensitive devices, a second differential gage connected to the fluid in the second and third pressure sensitive devices to indicate the difference between the bottom position and a third position intermediate the first two, and a thin flexible member within each of the gages separating the fluid in the interconnected pressure sensitive devices and coupled to a pressure indicating member to reflect substantially instantaneously changes in pressure within the pressure sensitive devices.

2. A system for measuring the height and density of a liquid in a container comprising a first fluid filled pressure sensitive device comprising a collapsible bellows within the container at the top thereof, a second fluid filled pressure sensitive device comprising a collapsible bellows within the container at the bottom thereof, a first differential gage connected to the fluid in the container in the said first and second pressure sensitive devices to indicate the difference in pressure between a position at the top of the container and a position at the bottom of the container, a third fluid filled pressure sensitive device comprising a collapsible bellows within the container intermediate the first and second pressure sensitive devices, a second differential gage connected to the fluid in the second and third pressure sensitive devices to indicate the difference in pressure between the bottom position and a third position intermediate the first two, said fluid within the bellows being of known density and the volume of the bellows being large with respect to the change in volume within the gages, and a thin flexible member within each of the gages separating the fluid in the interconnected pressure sensitive devices and coupled to a pressure indicating member to reflect substantially instantaneously changes in pressure within the pressure sensitive devices.

3. A system according to claim 1 in which the differential gages are of the Bourdon type.

4. A system according to claim 1 in which the differential gages each include two pressure chambers separated by said flexible member, a paramagnetic core whose reluctance varies in accordance with the position of said flexible member which varies in accordance with the pressure difference in said chambers, a winding on said core, said indicating member comprising an electric meter coupled to said winding for indicating the pressure difference.

5. A system according to claim 1 in which the differentail gages each include two pressure chambers separated by said flexible member, a paramagnetic core including a non-magnetic gap, a paramagnetic member disposed adjacent to said gap and coupled to said flexible member, a winding on said core, said indicating member comprising an electric meter coupled to said winding for indicating the pressure differential between said two pressure chambers.

6. A system according to claim 1 in which the differential gages each include two pressure chambers separated by said flexible member, a paramagnetic core including a non-magnetic gap, a movable paramagnetic member disposed adjacent to said gap and coupled to said flexible member, two windings on said core, means for connecting at least one of said windings to a source of alternating current power, and an electric meter coupled to the other of said windings for indicating the pressure difference between two pressure chambers.

7. A system as set forth in claim 1 wherein the flexible member of at least one of said differential gages consists of a flexible paramagnetic barrier movable between two paramagnetic cores, each of said cores supporting a winding and said windings connected to an indicating instrument and to a source of alternating current power.

8. A system according to claim 1 in which at least one of the differential gages includes opposed chambers, and in which its flexible member consists of a diaphragm between said chambers, a paramagnetic cylindrical element secured to the diaphragm, said cylindrical element having a weight equal to the weight of the liquid it displaces within the gage.

9. A system according to claim 1 in which at least one of the differential gages includes opposed chambers, and in which its flexible member consists of a corrugated diaphragm between said chambers, floats attached to the diaphragm, a paramagnetic cylindrical element secured to the diphragm, said cylindrical element having a weight equal to the weight of the liquid it displaces within the gage.

10. A system according to claim 1 in which at least one of the differential gages includes a chamber, and in which its flexible member consists of a diaphragm dividing said chamber into two equal chambers, a strain sensing element consisting of a length of wire on said diaphragm and a gage connected to the strain sensing element.

References Cited in the file of this patent

UNITED STATES PATENTS

| | | |
|---|---|---|
| 1,946,175 | Murphy | Feb. 6, 1934 |
| 2,360,886 | Osterberg | Oct. 24, 1944 |
| 2,447,233 | Bristol | July 26, 1949 |
| 2,507,501 | Clark | May 16, 1950 |
| 2,521,477 | Pellettere | Sept. 5, 1950 |
| 2,613,535 | Born | Oct. 14, 1952 |
| 2,683,989 | Clark | July 20, 1954 |
| 2,692,501 | Erwood | Oct. 26, 1954 |
| 2,696,738 | Lupfer | Dec. 14, 1954 |

FOREIGN PATENTS

| | | |
|---|---|---|
| 198,532 | Great Britain | June 7, 1923 |